(12) United States Patent
Gladd et al.

(10) Patent No.: US 7,868,251 B2
(45) Date of Patent: Jan. 11, 2011

(54) SHIELDED ELECTRIC CABLE ASSEMBLY

(75) Inventors: Joseph H. Gladd, Cortland, OH (US);
Joseph M. Senk, Cortland, OH (US);
William C. Ketterer, Girard, OH (US)

(73) Assignee: Delphi Technologies, Inc., Troy, MI (US)

( * ) Notice: Subject to any disclaimer, the term of this patent is extended or adjusted under 35 U.S.C. 154(b) by 311 days.

(21) Appl. No.: 12/082,025

(22) Filed: Apr. 8, 2008

(65) Prior Publication Data
US 2009/0250235 A1 Oct. 8, 2009

(51) Int. Cl.
*H02G 3/04* (2006.01)
(52) U.S. Cl. .................................. 174/72 A
(58) Field of Classification Search ........... 174/74 R, 174/78, 84 R, 88 C
See application file for complete search history.

(56) References Cited

U.S. PATENT DOCUMENTS

| | | | |
|---|---|---|---|
| 3,082,291 A * | 3/1963 | Parkinson et al. ........ 174/77 R |
| 3,322,885 A * | 5/1967 | May et al. ................ 174/78 |
| 4,929,195 A * | 5/1990 | Seidoh ................ 439/607.45 |
| 5,281,762 A * | 1/1994 | Long et al. ............... 174/78 |
| 5,468,911 A | 11/1995 | Leve et al. |
| 5,707,253 A | 1/1998 | Matsumoto et al. |
| 5,962,812 A | 10/1999 | Miyazaki |
| 5,965,847 A | 10/1999 | Tanaka et al. |
| 6,031,185 A * | 2/2000 | Bouveret et al. ......... 174/84 R |
| 6,107,572 A | 8/2000 | Miyazaki |
| 6,152,746 A | 11/2000 | Brown |
| 6,183,303 B1 | 2/2001 | Sato |
| 6,257,931 B1 | 7/2001 | Sakurai et al. |
| 6,297,447 B1 * | 10/2001 | Burnett et al. ......... 174/40 CC |
| 6,452,102 B1 | 9/2002 | DeForest, Jr. et al. |
| 6,554,623 B2 | 4/2003 | Yoshioka |
| 6,558,172 B2 | 5/2003 | Kanagawa |
| 6,606,787 B2 * | 8/2003 | Okumura et al. .......... 29/828 |
| 6,648,690 B2 | 11/2003 | Saito et al. |
| 6,659,780 B2 | 12/2003 | Parkinson et al. |
| 6,749,464 B2 | 6/2004 | Obata |
| 6,796,838 B2 | 9/2004 | Yoshioka |
| 6,811,441 B2 * | 11/2004 | Simpson ............... 439/607.47 |
| 6,945,817 B2 | 9/2005 | Miyazaki et al. |
| 6,951,483 B2 | 10/2005 | Kameyama |
| 7,044,756 B1 | 5/2006 | Asakura et al. |
| 7,160,150 B2 | 1/2007 | Annequin |
| 7,628,647 B2 * | 12/2009 | Semba et al. ............. 439/579 |

* cited by examiner

*Primary Examiner*—William H Mayo, III
(74) *Attorney, Agent, or Firm*—Thomas N. Twomey

(57) ABSTRACT

An electric cable assembly may include an electric cable and a conductive contact. The electric cable has a conductive core, an inner insulation jacket surrounding the conductive core, a conductive layer surrounding the inner insulation jacket, and an outer insulation jacket surrounding the conductive layer. The conductive contact is injection molded around the conductive layer at a prepared section of the electric cable so that the conductive contact can conduct electric current from the conductive layer.

22 Claims, 2 Drawing Sheets

SHIELDED ELECTRIC CABLE ASSEMBLY

FIELD OF THE INVENTION

This invention relates generally to shielded electric cable assemblies, and more particularly to providing electric contact between electric cables and metal shields.

BACKGROUND OF THE INVENTION

Electric cable assemblies can be used for high voltage connections, such as those connections found in high voltage batteries of hybrid vehicles. Sometimes the electric cable assemblies can itself emit, or be subjected to, electromagnetic radiation which may respectively create electromagnetic interference (EMI) with other electronic devices (e.g., vehicle radio) or with the electric cable assembly. This usually causes an undesirable disturbance. To prevent or limit the EMI, electric cable assemblies are commonly shielded and grounded.

SUMMARY OF THE INVENTION

One embodiment of the invention may include an electric cable assembly that itself may include an electric cable and a conductive contact. The electric cable has a conductive core, an inner insulation jacket surrounding the conductive core, a conductive layer surrounding the inner insulation jacket, and an outer insulation jacket surrounding the conductive layer. The conductive contact is injection molded around the conductive layer at a first prepared section of the electric cable so that the conductive contact can conduct electric current from the conductive layer.

Another embodiment of the invention may include a shielded electric cable assembly that itself may include a first metal shield, a second metal shield, an electric cable, a terminal, a conductive contact, and a nonconductive cable seal. The second metal shield connects with the first metal shield. The electric cable can be located inside of, or otherwise surrounded by, the first metal shield, the second metal shield, or both the first and the second metal shields. The electric cable has a conductive core, an inner insulation jacket surrounding the conductive core, a conductive layer surrounding the inner insulation jacket, and an outer insulation jacket surrounding the conductive layer. The terminal has an inner terminal that is attached over an otherwise exposed free end of the electric cable, and the terminal includes a terminal seal that is located on the electric cable axially away from the inner terminal. The conductive contact is injection molded around the conductive layer of the electric cable so that the conductive contact can conduct electric current from the conductive layer. The conductive contact has a first radial face. The nonconductive cable seal has a second radial face that abuts against the first radial face.

Another embodiment of the invention may include a method of applying a conductive contact to an electric cable. The method may include providing the electric cable with a conductive core, an inner insulation jacket surrounding the conductive core, a conductive layer surrounding the inner insulation jacket, and an outer insulation jacket surrounding the conductive layer. The method may also include exposing the conductive layer at a section of the electric cable. The method may further include injection molding the conductive contact around the exposed section of the electric cable.

DETAILED DESCRIPTION OF THE PREFERRED EMBODIMENTS

Figure 1:
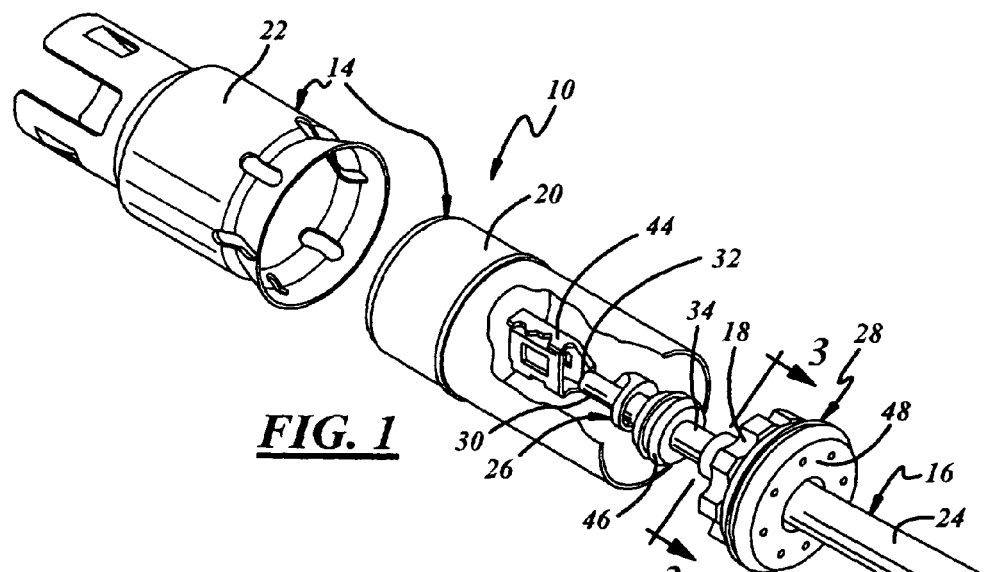
FIG. 1 is a partially exploded view of a shielded electric cable assembly that is cut-away at a section to show an electric cable assembly.
Figure 2:
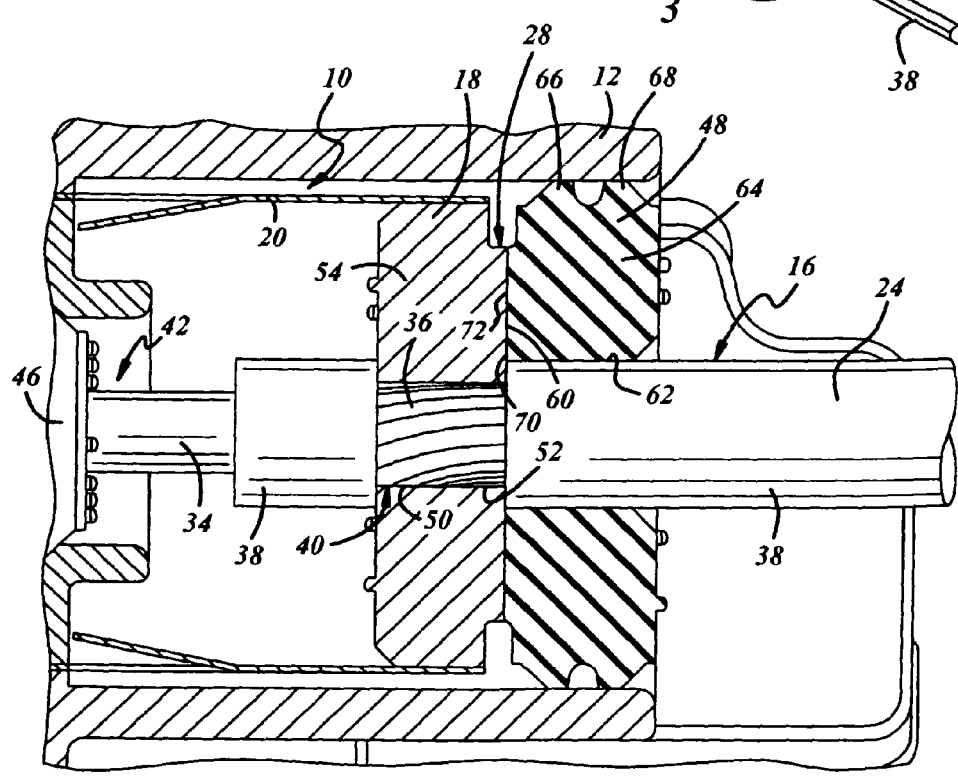
FIG. 2 is a fragmentary sectional view of the shielded electric cable assembly of FIG. 1 shown in an assembled state.
Figure 3:
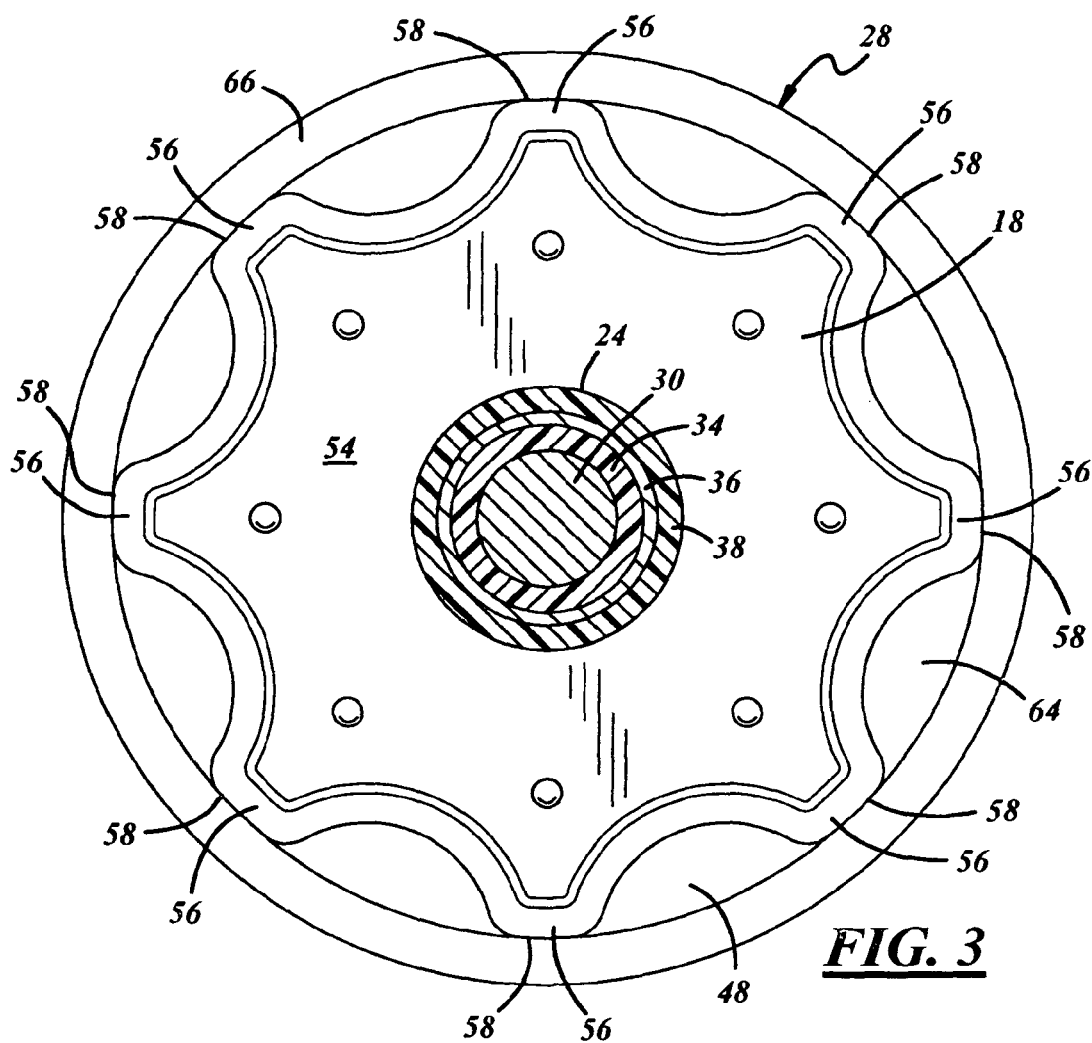
FIG. 3 is a sectional view taken along line 3-3 of FIG. 1.

Referring in more detail to the drawings, FIGS. 1-3 show a shielded electric cable assembly 10 that can be used in high voltage connections, such as those in batteries of hybrid vehicles. The assembly is shielded and grounded to prevent or at least limit emitting electromagnetic radiation and being subject to ambient electromagnetic radiation. In some high voltage connections, the shielded electric cable assembly 10 can be inserted into a connector housing 12 (FIG. 2) as will be known by skilled artisans. As shown, the shielded electric cable assembly 10 may include a connector assembly 14 and an electric cable assembly 16. The electric cable assembly 16 may include a conductive contact 18 that is injection molded in-place, or separately placed, over an electric cable 24. Injection molding the conductive contact 18 provides, among other things, a simplified assembly process as compared to a non-injection molding assembly process, accurate positioning of the conductive contact 18 on the electric cable 24, and a more intimate and precise connection between the conductive contact and the electric cable. Components of the shielded electric cable assembly 10 can have a somewhat circular and cylindrical shape which naturally defines various directions with respect to that shape. For example, the term "radially" refers to a direction that is generally along an imaginary radius of the related shape, the term "axially" refers to a direction that is generally along an imaginary axis of the related shape, and the term "circumferentially" refers to a direction that is generally along an imaginary circumference of the related shape.

The connector assembly 14 can be used to couple, or connect, the shielded electric cable assembly 10 to other components, and to shield and ground the electric cable assembly 16. As shown in FIG. 1, the connector assembly 14 may include a first, or male metal shield 20 that telescopes at one end with a second, or female metal shield 22 when the two are assembled. The male and female metal shields 20, 22 may each have a generally cylindrical shape and may be manufactured by machining, a casting process, or the like. These metal shields may come in various forms other than those shown as will be appreciated by skilled artisans.

The electric cable assembly 16 can be prepared at an end in order to make an electric connection with a complementary assembly (not shown) and in order to be inserted into the connector assembly 14 and the connector housing 12. At its prepared end, the electric cable assembly 16 may include the electric cable 24, a terminal 26, and an injection-molded assembly 28. The electric cable 24 may be a conventional coax cable that is known to skilled artisans to carry electric current. Referring to FIG. 3, the electric cable 24 may include, from inside out, a conductive core 30 having a free end 32 (FIG. 1) that is exposed for providing the terminal 26, an inner insulation jacket 34 that surrounds the conductive core 30, a conductive layer 36 that surrounds the inner insulation jacket, and an outer insulation jacket 38 that surrounds the conductive layer. In some embodiments, the conductive layer 36 may be a metal braid that is woven around the inner insulation jacket 34. A first prepared section 40 may be provided on the electric cable 24 in order to adapt the electric cable for the conductive contact 18. At the first prepared section 40, the electric cable 24 is stripped down to, or otherwise exposes, the conductive layer 36. Similarly, a second prepared section 42 may be provided on the electric cable 24 in order to adapt the electric cable for a component of the terminal 26, as it will be subsequently described. At the second prepared section 42, the electric cable 24 may be stripped down to, or otherwise exposes, the inner insulation jacket 34.

The terminal 26 may be attached at the free end 32 so that the electric cable assembly 16 can make an electric connection to a mating terminal (not shown). Referring to FIG. 1, the terminal 26 may include an inner terminal 44 that is constructed to couple with a mating inner terminal (not shown). The inner terminal 44 may come in various forms other than that shown as will be appreciated by skilled artisans. The terminal 26 may also include a terminal seal 46 that, when the shielded electric cable assembly 10 is assembled, seals partly against the connector housing 12 (see FIG. 2). The terminal seal 46 may come in various forms other than that shown as will be appreciated by skilled artisans.

The injection-molded assembly 28 provides the electric cable assembly 16 with an electric interface, or ground, to the connector assembly 14, and also provides a seal against the connector housing 12. The injection-molded assembly 28 may include the conductive contact 18 and a nonconductive cable seal 48. The conductive contact 18 provides a medium for electric current to flow between the conductive layer 36 and the first metal shield 20. As shown, the conductive contact 18 has a generally cylindrical shape and can be composed of an elastomer material such as silicone that is impregnated with silver-plated aluminum powder, called CHO-SEAL1285 and supplied by Chomerics of Wolburn, Mass., U.S.A., (www.chomerics.com). Of course, other conductive elastomers can be used. The conductive contact 18 may be formed by an injection molding process that molds the conductive contact 18 circumferentially continuously around the electric cable 24 and at the first prepared section 40. The conductive contact 18 may be located on the electric cable 24 in a position that is axially offset, or away from, the inner terminal 44 and that is adjacent the first metal shield 20. By injection molding, the conductive contact 18 may be more precisely and consistently positioned with respect to the inner terminal 44 by virtue of the process itself, and the conductive contact 18 may completely surround and encircle the first prepared section 40, and isolate and seal the otherwise exposed conductive layer 36 to help prevent the conductive layer from making electric contact with other components. An interface 50 is formed between the contacting surfaces of the conductive contact 18 and the conductive layer 36. A mechanical (second) bond 52 is formed at the interface 50 by the molten material solidifying over the conductive layer 36 to help prevent the conductive contact 18 from sliding axially, or otherwise becoming loose, at the first prepared section 40. Referring to FIG. 3, the conductive contact 18 may have a body 54 with a plurality of cogs or contact points 56 that project radially from the body 54 and to a free end 58. Each of the contact points 56 touch the first metal shield 20 at their respective free end 58 when the shielded electric cable assembly 10 is assembled, and each of the contact points 56 conduct electric current thereat. The body 54 may be bounded axially between radial faces including a first radial face 60 that, when assembled, abuts the nonconductive cable seal 48.

The nonconductive cable seal 48 bears and seats against a surface of the connector housing 12 in order to help seal the shielded electric cable assembly 10 from environmental contaminants, such as water that may be present. As shown, the nonconductive cable seal 48 has a generally cylindrical shape that is slightly larger in size than that of the conductive contact 18. In one example, the nonconductive cable seal 48 may be composed of an elastomer material such as an unfilled silicone; of course, other elastomer materials can be used. The nonconductive cable seal 48 can be formed by an injection molding process that molds the nonconductive cable seal circumferentially continuously around the electric cable 24, or the nonconductive cable seal can be injection molded away from the electric cable as a separate component that is subsequently disposed on and retained to the electric cable. Referring to FIG. 2, if injection molded around the electric cable 24, a mechanical, and in some cases a chemical (third) bond 62 may be formed at an interface between the contacting surfaces of the nonconductive cable seal 48 and the electric cable 24.

The nonconductive cable seal 48 may have a body 64 with a first circumferential sealing bead 66 projecting radially from the body 64 and extending circumferentially continuously around the body. A second circumferential sealing bead 68 may also project radially from the body 64 and may also extend circumferentially continuously around the body. The nonconductive cable seal 48 may be bounded axially between radial faces including a second radial face 70 that, when assembled, abuts the first radial face 60 of the conductive contact 18. In some cases, a mechanical bond, a chemical bond, or both (first) bonds 72 is formed at an interface between the respective radial faces 60, 70. The bond 72, among other things, helps maintain the axial position of the nonconductive cable seal 48 with respect to the free end 32, and helps maintain the orientation of the nonconductive cable seal 18 with respect to the conductive contact 18.

Figure 4:
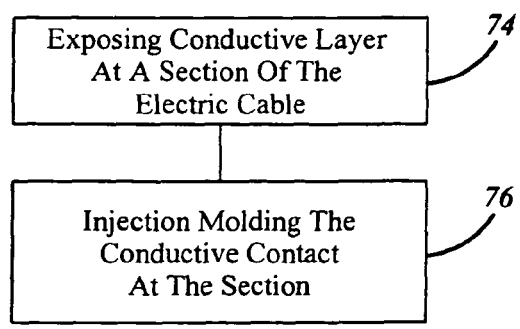
FIG. 4 is a schematic showing some steps of a method of applying a conductive contact to an electric cable.

FIG. 4 shows some of the steps involved in one example method of applying the conductive contact 18 to the electric cable 24. Skilled artisans will appreciate that the exact injection molding process used may vary in equipment, steps, specifications, and the like; and may depend in part on the materials used, the geometry of the molded part, and the like. At a step 74, the conductive layer 36 is exposed at the first prepared section 40 of the electric cable 24. To do so, the outer insulation jacket 38 can be stripped off of the conductive layer 36. One method of stripping is called center stripping and can be accomplished by a laser stripping device. In center stripping, a section of the outer insulation jacket 38 is removed from a midsection of the electric cable 24, while the outer insulation jacket is left intact on both sides of the section. Skilled artisans will appreciate that the exact stripping process may vary in equipment, steps, specifications, and the like; and may depend in part on the electric cable, the desire prepared section, and the like.

In a step 76, the conductive contact 18 is formed by injection molding around the first prepared section 40. A first mold tool is placed around, and sealed at its ends against, the first prepared section 40 and a measured quantity of a first molten material is injected into a cavity defined by the first tool mold. The cavity may define a predetermined shape which shapes and forms the conductive contact 18. The first molten material then solidifies over the first prepared section 40 to create the bond 52 thereat. In another step, the nonconductive cable seal 48 may be disposed on the electric cable 24. In one example, the nonconductive cable seal 48 can be injection molded around the outer insulation jacket 38 of the electric cable 24. A second mold is placed around, and sealed at its end against, the first prepared section 40 so that the nonconductive cable seal 48 will abut the conductive contact 18. A measured quantity of a second molten material is injected into a cavity defined by the second mold. The second molten material then solidifies into a second predetermined shape which shapes and forms the nonconductive cable seal 48. In another example, the nonconductive cable seal 48 is formed in a separate injection molding process away from the electric cable 24. In that case, the nonconductive cable seal 48 can be subsequently coupled to the electric cable 24 in a number of ways including by a mechanical retainer, press-fitting, gluing, or the like. And still in other examples, the conductive contact 18 and the nonconductive cable seal 48 may be injection molding concurrently or successively, such as by co-injection molding or dual-injection molding.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. An electric cable assembly, comprising:
   an electric cable having,
     a conductive core,
     an inner insulation jacket surrounding the conductive core,
     a conductive layer surrounding the inner insulation jacket,
     an outer insulation jacket surrounding the conductive layer, and
     a conductive contact surrounding the conductive layer and in electrical communication with the conductive layer,
   wherein the conductive contact includes a body having a plurality of integrally formed contact points each projecting radially outward toward a respective free end, said plurality of integrally formed contact points surrounding the body of the conductive contact.

2. The electric cable assembly of claim 1 wherein the electric cable terminates at a free end, and the conductive contact is located axially remote from the free end where the conductive contact is disposed in the electronic cable assembly in a center stripped section of the outer insulation jacket of the electric cable.

3. The electric cable assembly of claim 1 further comprising a nonconductive cable seal abutting the conductive contact and being disposed around the outer insulation jacket.

4. The electric cable assembly of claim 3 wherein the nonconductive cable seal is injection molded around the outer insulation jacket.

5. The electric cable assembly of claim 4 wherein a first bond is formed between abutting surfaces of the conductive contact and the nonconductive cable seal, and a second bond is formed at an interface of the conductive contact and the conductive layer.

6. The electric cable assembly of claim 1 wherein the conductive core has an exposed free end, and the electric cable assembly further comprises a terminal with an inner terminal attached to the exposed free end, and wherein the conductive contact is located axially away from the inner terminal.

7. The electric cable assembly of claim 6 wherein the terminal also includes a terminal seal disposed around the inner insulation jacket at a second prepared section of the electric cable, the terminal seal being located axially between the inner terminal and the conductive contact.

8. The electric cable assembly of claim 1 wherein the nonconductive cable seal includes a body having a pair of integrally formed circumferential sealing beads formed continuously around the body of the nonconductive cable seal.

9. The electric cable assembly of claim 1 wherein a bond is formed at an interface of the conductive contact and the conductive layer, thus isolating the conductive layer from other components of an associated assembly.

10. The electric cable assembly of claim 1 wherein the conductive contact is formed of an elastomeric material having a circular shape.

11. A shielded electric cable assembly comprising:
    a first metal shield adapted for receiving a second metal shield, wherein the received second metal shield surroundingly overlies, and is in electrical and mechanical communication with at least a portion of the first metal shield; and
    an electric cable with an end portion disposed inside one of,
      (i) the first metal shield,
      (ii) the second metal shield, and
      (iii) the first and the second metal shield, the electric cable having a conductive core with an exposed free end, an inner insulation jacket surrounding the conductive core, a conductive layer surrounding the inner insulation jacket, and an outer insulation jacket surrounding the conductive layer;
    a terminal with an inner terminal attached to the exposed free end, the terminal including a terminal seal disposed around the electric cable and located axially away from the inner terminal;
    a conductive contact disposed surrounding the conductive layer and configured to provide electrical communication between the conductive layer and the first metal shield;
    a nonconductive cable seal disposed around the electric cable, the nonconductive cable seal having a second radial face abutting the first radial face.

12. The electric cable assembly of claim 11 wherein the conductive contact is injection molded to the electric cable at a first prepared section that is located axially away from the exposed free end, the first prepared section being formed by center stripping a section of the outer insulation jacket.

13. The shielded electric cable assembly of claim 11 wherein the nonconductive cable seal is injection molded circumferentially around the electric cable.

14. The shielded electric cable assembly of claim 13 wherein a first bond is formed between the first radial face and the second radial face, a second bond is formed at an interface of the conductive contact and the conductive layer, and a third bond is formed at an interface of the nonconductive cable seal and the electric cable.

15. The electric cable assembly of claim 11 wherein the conductive contact has a plurality of contact points that each project radially to a respective free end, that are disposed circumferentially around a body of the conductive contact, and that each contact the first metal shield so that electrical communication occurs from the conductive layer through the conductive contact and into the first metal shield.

16. The electric cable assembly of claim 11 wherein the nonconductive cable seal has a pair of integral sealing beads that are formed continuously around a body of the nonconductive cable seal.

17. The electric cable assembly of claim 11 wherein
the first metal shield is a male-type connector,
the second metal connector is a female-type connector, and
the conductive contact has a circular shape configurably disposed within the first metal shield.

18. The electric cable assembly of claim 11 wherein the conductive contact is formed of an elastomeric material and has a circular shape.

19. The electric cable assembly of claim 11 wherein the conductive contact includes a body having a plurality of integrally formed contact points each projecting radially outward toward a respective free end, said plurality of integrally formed contact points surrounding the body of the conductive contact.

20. A method of applying a conductive contact to an electric cable, the method comprising;

providing the electric cable with a conductive core, an inner insulation jacket surrounding the conductive core, a conductive layer surrounding the inner insulation jacket, and an outer insulation jacket surrounding the conductive layer;

exposing the conductive layer at a section of the electric cable;

injection molding the conductive contact around the section of the electric cable in order to surround the section by the conductive contact, wherein the conductive contact includes a body having a plurality of integrally formed contact points each projecting radially outward toward a respective free end, said plurality of integrally formed contact points surrounding the body of the conductive contact.

21. The method of claim 20 further including the step of, injection molding a nonconductive cable seal around the outer insulation jacket wherein, the nonconductive cable seal abuts against the conductive contact.

22. The method of claim 20 wherein the step of exposing the conductive layer further includes center stripping the electric cable at said section so as to expose the conductive layer at said section, and said section being located axially away from a free end of the electric cable.

* * * * *